United States Patent Office 3,023,081
Patented Feb. 27, 1962

---

3,023,081
METHOD FOR THE PREPARATION OF SELENIDES AND TELLURIDES
Stanley M. Kulifay, Dayton, Ohio, assignor to Monsanto Chemical Company, St. Louis, Mo., a corporation of Delaware
No Drawing. Filed Sept. 12, 1958, Ser. No. 760,569
9 Claims. (Cl. 23—50)

The present invention relates to a new method for the preparation of inorganic metal compounds, such as binary and higher tellurides, selenides, antimonides, and arsenides, and particularly mercury telluride, copper selenide and silver selenide. It is an object of the invention to prepare a semiconductor type of a crystalline form of the said metal compounds. It is a further object of the invention to prepare the said metal compounds by a low-temperature precipitation method employing solutions of an organic aldehyde reducing agent having the formula, RCHO, in which R is selected from the group consisting of hydrogen and organic radicals having from 1 to 7 carbon atoms, such as dextrose, as a precipitating agent and using simple apparatus. Various organic aldehyde reducing agents may be used including dextrose, glucose, levulose, formaldehyde, acetaldehyde, propionaldehyde, butyraldehyde, valeraldehydes, caproaldehydes, heptaldehydes, chloral, glyoxal, acrolein, crotonaldehyde, furfural and benzaldehyde, as well as invert sugar, for example, the product obtained by heating sucrose with dilute acids or the enzyme invertase to obtain a 6-carbon atom glucose and fructose mixture may be employed in the present invention. The preferred members of the group of aldehyde reducing agents are dextrose, glucose, invert sugar, chloral, acrolein and formaldehyde.

It is also an object of the invention to prepare metal binary, ternary and higher compounds, such as tellurides, selenides, antimonides and arsenides having a precisely-controlled stoichiometric or non-stoichiometric composition. In general, the present method makes it possible to prepare various mixed compounds, that is, "doped" ternary and higher compounds, as distinguished from straight binary compounds. The "doped" compositions referred to herein are those in which a given stoichiometric or non-stoichiometric compound contains an added element, usually in very small amounts. It is also an object of the invention to prepare uniformly "doped" metal tellurides, selenides, antimonides and arsenides by precipitating such modified compounds by means of dextrose and other aldehyde derivatives and analogues.

It is a further object of the invention to prepare in essentially quantitative yield various binaries, such as tellurides, selenides, antimonides, and arsenides and other compounds of metals selected from the group consisting of mercury, platinum, palladium, lead, indium, cobalt, tin, antimony, bismuth, cadmium, nickel, thallium, ruthenium, rhodium, osmium, iridium, copper, silver, gold, tellurium and selenium, by precipitation from soluble compounds by means of dextrose or the various reducing agents set forth above. The compounds which are made by the present method include such compounds as mercury cupride.

The prior art methods which have been available for the preparation of semiconductor-type compounds have suffered a disadvantage in that it has been difficult to achieve precise or predictable stoichiometric proportions which are necessary in order to obtain controlled semiconductive properties. For example, the conventional method of preparing mercury telluride has been a relatively high-temperature, long-time (up to 80 hours) fusion of the respective elements. Another method for the preparation of mercury telluride has been by the reaction of solutions of mercury salts with the highly toxic, exceedingly unstable hydrogen telluride in complicated apparatus. Both of these prior art methods have yielded mixtures of uncertain composition, which, being inherently unbalanced, were unpredictable for use as a semiconductor material.

Another difficulty encountered in the methods of the prior art has been the quantitative control of "doping" additives. Such additive materials are employed in minor proportions, which have been difficult to introduce in the precise amounts required to obtain the desired semiconductive properties.

The present method also eliminates the difficult purification of metal tellurides, selenides, antimonides and arsenides which involves distilling off the unreacted components at high temperatures from the crude compounds obtained by conventional methods. One of the difficulties which has attended distillation purification is the partial decomposition of the product, with a consequent upsetting of the desired stoichiometric proportion.

Another advantage of the present method is that it avoids the necessity of first isolating solids, such as selenites and tellurites for subsequent reduction—the selenide or telluride is produced directly from solutions of the metals and/or metalloids.

In one embodiment of the present invention the process begins with the production of a solution of the desired purity containing the dissolved compounds of the specific metal or metals and of tellurium, selenium, antimony, or arsenic. The components may also be introduced as the respective elements of compounds which are dissolved or vaporized for further reaction. However, the invention may be carried out in any desired medium, preferably selected from the group consisting of solutions, melts and vapors. The media contemplated in the present invention embrace solutions of the metal ions, including tellurium, selenium, antimony and arsenic as well as liquid media, such as melts exemplified by molten chloride, such as selenium chloride and bismuth chloride. Vapor phase media are also included, for example, mercuric chloride and tellurium chloride with or without a carrier gas.

The concentration employed when solutions are used will be dictated in large part by the solubility of the respective compounds, for example, chlorides or nitrates of mercury, indium, cobalt, tin, arsenic, antimony, lead, bismuth, cadmium, nickel, platinum, palladium, ruthenium, rhodium, osmium, iridium, thallium, copper, silver, gold, tellurium, selenium, and combinations thereof. In general, the concentration of the soluble metal salt and of the soluble tellurium, selenium, antimony, or arsenic compound may range up to the solubility limits of the respective compounds. For example, in preparing mercury telluride, the mercuric nitrate was employed as a 20% solution, while the telluric acid was used in 10% to 15% by weight solution. The source materials of the said tellurides, selenides, antimonides and arsenides are preferably the acid solutions of the element or oxide or any pure, soluble compound. In general, the proportion of the organic aldehyde reducing agent which is employed is 0.1 to 25.0 g. molecular weight (mole) of the said organic aldehyde reducing agent per gram atomic weight of the said tellurium, selenium, antimony, or arsenic. A preferred range is from 1.0 to 15 gram molecular weights. When the reducing agents are mentioned herein, such expressions include not only the reducing agents, per se, but also their commercial solutions and derivatives, such as syrups, in which form the said reducing agents are commonly supplied.

The solution as described above may be heated in order to increase the solubility of the respective compounds therein. The pressure under which the process is conducted is usually atmospheric, but is not critical, and moderate pressure may be employed. The time required for the reaction is also a non-critical factor, although reaction appears to be complete after the first few minutes.

The precipitation of the desired metal tellurides, selenides, arsenides and antimonides is preferably carried out by adding a combined solution or individual solutions of the said starting materials to a solution of aqueous dextrose or other organic aldehyde reducing agent. However, the three solutions of the anion, the cation and the reductant may also be mixed simultaneously, or by first adding the reductant to one of the reactants, or to the combined mixture. The strength of such solutions is not critical, although it is necessary to operate with an excess of the solution containing the reductant such as dextrose. The present invention may employ either a liquid medium for the precipitation as described above, or a spray-type of precipitation employing liquid sprays of some of the starting materials, such as the metal salts and/or the reducing agent.

The above discussion has been concerned chiefly with the preparation of stoichiometric compounds. However, non-stoichiometric compositions may readily be made by the present method by employing an excess of either the anion or the cation. For example, an excess of 1% by weight of silver introduced in the preparation of silver selenide results in the production of a uniform product having 1% silver as free metal in excess of the theoretical $Ag_2Se$. The working solutions described above may also contain therein any desired soluble doping compound capable of reduction to the element by the reducing agent, such as copper, silver, gold or the platinum metals.

The by-products of the reaction are water-soluble, and accordingly may be removed from the products by simple filtration and washing.

The temperature employed in carrying out the invention may be from 20° C. to 150° C. in aqueous systems or 20° C. to 200° C. in vapor systems in order to obtain a reduction to the desired metal selenide, telluride, antimonide, or arsenide.

Another embodiment of the present invention based upon the precipitation of binary, and mixed compounds, such as ternary and higher compounds by organic aldehyde reducing agents is the employment of a complexing agent in the precipitation. Preferred complexing agents in the present invention include the group of tartaric acid, citric acid and malic acid. It has been found that the use of the said complexing agents makes it possible to carry out the precipitation without incurring the precipitation of metal hydroxides or other contaminating basic compounds. The proportion of the complexing agents, such as tartaric acid, may be varied widely, such as over the range of from 0.1% to 20% by weight relative to the weight of the total solution present.

The following examples illustrate specific embodiments of the present invention:

Example 1

The preparation of mercury telluride was carried out by first weighing out 2.0519 g. of mercury which was dissolved by warming with 10 ml. of 1:1 nitric acid. The tellurium was provided as 1.3050 g. of the powdered element, in equivalent stoichiometric proportion with the mercury. The tellurium was dissolved in the above acid mixture with the aid of 16 ml. of 1:1 aqua regia in water.

A solution containing the dextrose precipitating agent was prepared from 30 g. of dextrose dissolved in 150 ml. of water and 60 ml. concentrated ammonium hydroxide. The dextrose was completely dissolved and the solution was heated to boiling, after which the solution of mixed mercury and tellurium compounds was added thereto slowly with constant stirring. A gray precipitate of mercury telluride, which formed during the stirring operation, soon formed a dense, black powder. After boiling for 90 minutes, the product was obtained by filtering the solution and washing the precipitate with water, followed by methanol. The product was dried at 95° C., and the yield was 100.0%. It was analyzed by X-ray diffraction analysis and was found to be face-centered cubic in structure and to have the stoichiometric proportion of the compound HgTe. The lattice constant for the compound was 6.44. No other crystalline material, such as uncombined Te, could be detected.

Example 2

The preparation of beta-silver selenide, $Ag_2Se$, was carried out by first preparing separate solutions of 3.3978 g. of silver nitrate in 15 ml. water+10 ml. concentrated nitric acid, and 0.7896 g. of powdered selenium in 9 ml. of 2:1 nitric acid. The combined solutions were added to a boiling solution consisting of 30 g. dextrose, 150 ml. water and 60 ml. ammonium hydroxide. This was then boiled and handled in accordance with the method of Example 1. The product was obtained in 99.7% yield as a dark gray microcrystalline powder whose D values for lattice constant by X-ray diffraction examination agreed with those in the literature (ASTM) for beta-silver selenide (naumannite).

Example 3

The preparation of copper selenide, $Cu_2Se$, was conducted by first dissolving 1.5908 g. of cupric oxide in 10 ml. 1:1 nitric acid in water and 0.7896 g. of powdered selenium in 9 ml. 2:1 nitric acid in water. The combined solutions were then added to a boiling solution of 30 g. dextrose, 150 ml. water, and 60 ml. ammonium hydroxide. This was then handled in accordance with the method of Example 1. The black product was obtained as a cubic, microcrystalline powder which, when examined by X-ray diffraction means, revealed $Cu_2Se$ (berzelianite) as the only crystalline component present.

What is claimed is:

1. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides which comprises precipitating the desired compounds from media containing the respective members thereof by admixture with precipitating agents of the group consisting of dextrose, glucose, invert sugar, choral, acrolein and formaldehyde, in the proportion of from 0.1 to 25.0 gram molecular weight per gram atomic weight of tellurium and selenium, and isolating the desired compound from the mixture.

2. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides which comprises precipitating the desired compound from solutions containing the respective ions thereof by admixture with a solution of dextrose, in the proportion of from 0.1 to 25.0 gram molecular weight per gram atomic weight of tellurium and selenium, and isolating the desired compound from the mixture.

3. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides which comprises precipitating the desired compound from solutions containing the respective ions thereof by admixture with a solution of glucose in the proportion of from 0.1 to 25.0 gram molecular weight per gram atomic weight of tellurium and selenium, and isolating the desired compound from the mixture.

4. Method for the preparation of mercury telluride, which comprises precipitating dissolved mercury and tellurium ions by admixture with aqueous dextrose in the proportion of from 0.1 to 25.0 gram molecular weight per gram atomic weight of tellurium, and isolating the desired compound from the mixture.

5. Method for the preparation of copper selenide which comprises precipitating dissolved copper and selenium ions by admixture with aqueous dextrose in the proportion of from 0.1 to 25.0 gram molecular weight per gram atomic weight of selenium, and isolating the desired compound from the mixture.

6. Method for the preparation of silver selenide, which comprises precipitating dissolved silver and selenium ions by admixture with aqueous dextrose in the proportion of from 0.1 to 25.0 gram molecular weight per gram atomic weight of selenium, and isolating the desired compound from the mixture.

7. Method for the preparation of bismuth telluride, which comprises precipitating dissolved bismuth and tellurium ions by admixture with aqueous dextrose in the proportion of from 0.1 to 25.0 gram molecular weight per gram atomic weight of tellurium, and isolating the desired compound from the mixture.

8. Method for the preparation of palladium telluride, which comprises precipitating dissolved palladium and tellurium ions by admixture with aqueous dextrose in the proportion of from 0.1 to 25.0 gram molecular weight per gram atomic weight of tellurium, and isolating the desired compound from the mixture.

9. Method for the preparation of compounds selected from the class consisting of mercury, platinum, palladium, lead, indium, cobalt, tin, bismuth, cadmium, nickel, thallium, ruthenium, rhodium, osmium, iridium, copper, silver and gold tellurides and selenides which comprises precipitating the said composition by admixture of a solution containing the respective members thereof with a solution of an organic aldehyde reducing agent selected from the group consisting of dextrose, glucose, invert sugar, chloral, acrolein and formaldehyde in the proportion of from 0.1 to 25.0 gram molecular weight of the said organic aldehyde reducing agent per gram atomic weight of the said tellurium and selenium, the said precipitation being conducted in the presence of a compound selected from the group consisting of tartaric acid, citric acid and malic acid, the proportion of the said compound being from 0.1% to 20% by weight relative to the weight of total solutions present, and isolating the desired compound from the mixture.

References Cited in the file of this patent
UNITED STATES PATENTS

| | | |
|---|---|---|
| 2,534,562 | Thomsen | Dec. 19, 1950 |
| 2,860,954 | Bueker et al. | Nov. 18, 1958 |

FOREIGN PATENTS

| | | |
|---|---|---|
| 142,728 | Australia | Aug. 6, 1951 |

OTHER REFERENCES

Feigl: "Chemistry of Specific, Selective and Sensitive Reactions," Academic Press Inc., Publishers, N.Y., 1949, pages 69 to 108.

Mellor: "Comprehensive Treatise on Inorganic and Theoretical Chemistry," Longmans, Green and Co., N.Y., vol. 10, 1930, pages 769 and 771; vol. 11, 1931, pages 52, 60 and 64.

Thorpe: "Dictionary of Applied Chemistry," Longmans, Green and Co., N.Y., 1916, vol. V, p. 434.

Hampel: "Rare Metals Handbook," Reinhold Publ. Corp., N.Y., 1954, pp. 369, 375, 407 and 413.